(12) United States Patent
Inomata

(10) Patent No.: US 11,438,477 B2
(45) Date of Patent: Sep. 6, 2022

(54) INFORMATION PROCESSING DEVICE, INFORMATION PROCESSING SYSTEM AND COMPUTER READABLE MEDIUM

(71) Applicant: FUJIFILM BUSINESS INNOVATION CORP., Tokyo (JP)

(72) Inventor: Kohshiro Inomata, Yokohama (JP)

(73) Assignee: FUJIFILM Business Innovation Corp., Tokyo (JP)

(*) Notice: Subject to any disclaimer, the term of this patent is extended or adjusted under 35 U.S.C. 154(b) by 85 days.

(21) Appl. No.: 16/997,187

(22) Filed: Aug. 19, 2020

(65) Prior Publication Data

US 2021/0227086 A1 Jul. 22, 2021

(30) Foreign Application Priority Data

Jan. 16, 2020 (JP) .............................. JP2020-005305
Jan. 16, 2020 (JP) .............................. JP2020-005306

(51) Int. Cl.
*H04N 1/00* (2006.01)
*G06V 10/42* (2022.01)
*G06V 30/413* (2022.01)
*G06V 30/244* (2022.01)

(52) U.S. Cl.
CPC ......... *H04N 1/00816* (2013.01); *G06V 10/42* (2022.01); *G06V 30/2455* (2022.01); *G06V 30/413* (2022.01)

(58) Field of Classification Search
CPC ................................................ H04N 1/00816

USPC ........................................................ 358/453
See application file for complete search history.

(56) References Cited

U.S. PATENT DOCUMENTS

| 2008/0244384 | A1* | 10/2008 | Yoshitani | G06K 9/00456 715/251 |
| 2009/0074291 | A1* | 3/2009 | Iinuma | G06K 9/00456 382/178 |
| 2009/0285489 | A1* | 11/2009 | Kanoh | G06K 9/2054 382/190 |
| 2016/0261529 | A1* | 9/2016 | Agrawal | H04L 67/02 |

FOREIGN PATENT DOCUMENTS

| JP | 2011-065311 A | 3/2011 |
| JP | 2012-198684 A | 10/2012 |

* cited by examiner

*Primary Examiner* — Jacky X Zheng
(74) *Attorney, Agent, or Firm* — Oliff PLC

(57) ABSTRACT

An information processing device includes a processor configured to: group electronic documents that have been processed, based on similarity degree of the electronic documents into one or more groups; determine a group, among the one or more groups, to which at least one received electronic document is to belong; determine whether the at least one received document is a modified version of one or more electronic documents belonging to the determined group, the modified version having been partially modified with respect to the one or more electronic documents belonging to the determined group; and specify a blank portion in the at least one received electronic document by comparing the at least one received electronic document with the one or more electronic documents belonging to the determined group.

15 Claims, 10 Drawing Sheets

FIG. 5A

| APPLICATION | | | | |
|---|---|---|---|---|
| ○ | × | ○ | [F C B] K1 | |
| △ | × | □ | [ ] M1 | |
| × | × | △ | [Z F C] K1 | |
| □ | □ | ○ | [B B A] K1 | |
| △ | △ | □ | [C F Q] K1 | |

FIG. 5B

| APPLICATION | | | | |
|---|---|---|---|---|
| ○ | × | ○ | [G C B] K3 | |
| △ | × | □ | [K T F] K2 | |
| × | × | △ | [C B M] K3 | |
| □ | □ | ○ | [I K M] K3 | |
| △ | △ | □ | [G C S] K3 | |

FIG. 5C

| APPLICATION | | | | |
|---|---|---|---|---|
| ○ | × | ○ | F C B | |
| △ | × | □ | [ ] M1 | |
| × | × | △ | Z F C | |
| □ | □ | ○ | B B A | |
| △ | △ | □ | C F Q | |

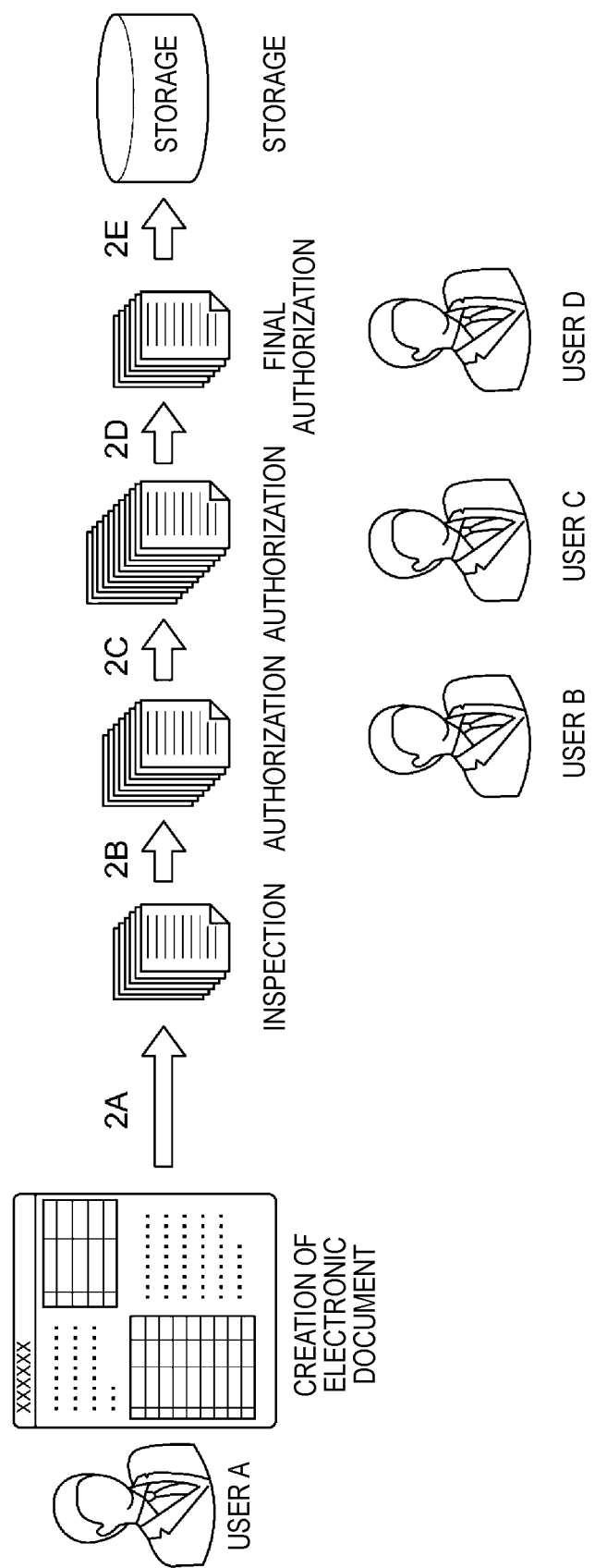

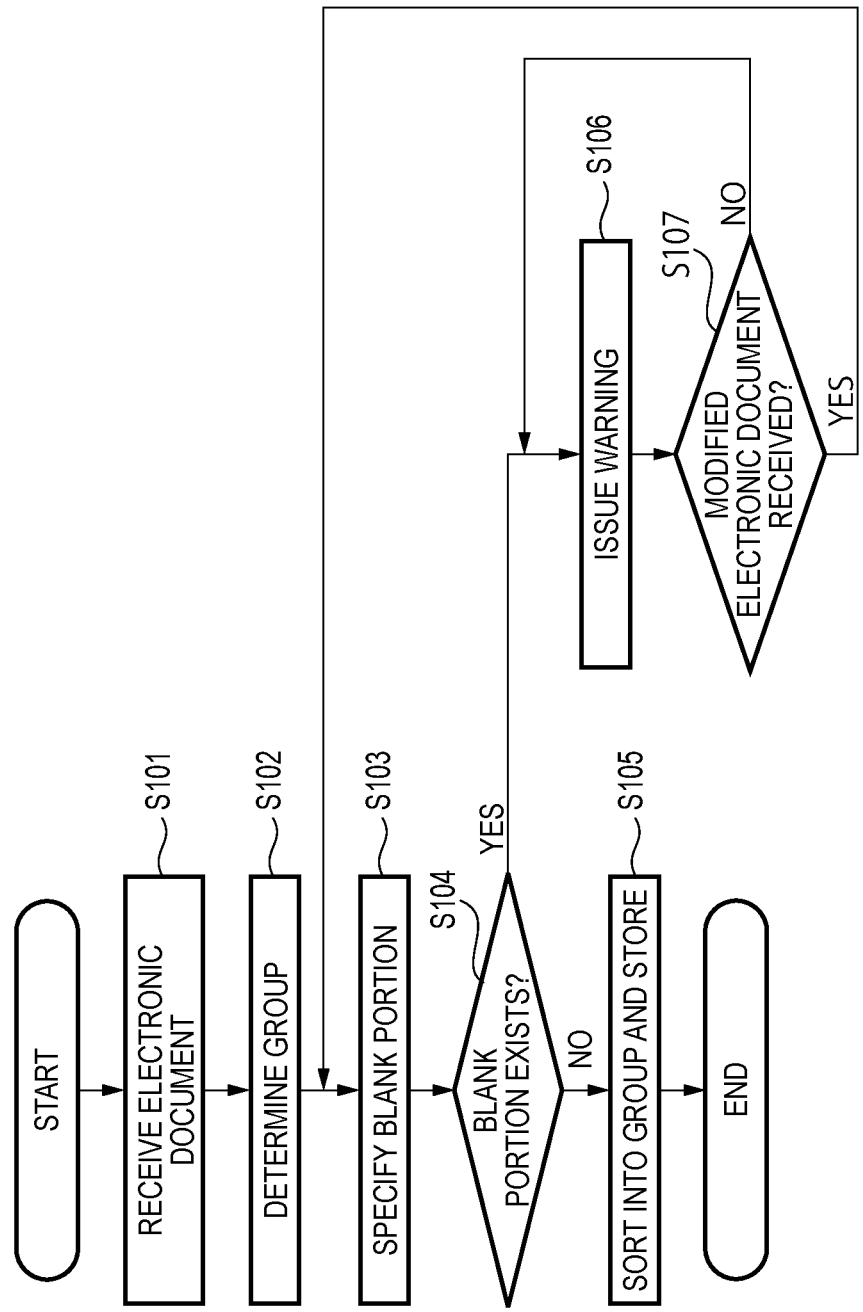

FIG. 9

GROUP ID, NUMBER OF INTERSECTIONS, OCR RESULT, COORDINATES OF INTERSECTIONS, NUMBER OF PIECES OF STORED DATA, [STORED DATA 1, STORED DATA 2 ... STORED DATA n], [ENTRY AREA COORDINATES]

INFORMATION PROCESSING DEVICE, INFORMATION PROCESSING SYSTEM AND COMPUTER READABLE MEDIUM

CROSS-REFERENCE TO RELATED APPLICATIONS

This application is based on and claims priority under 35 USC 119 from Japanese Patent Application No. 2020-5305 filed on Jan. 16, 2020 and Japanese Patent Application No. 2020-5306 filed on Jan. 16, 2020.

BACKGROUND

Technical Field

The present invention relates to an information processing device, an information processing system and a computer readable medium.

Related Art

In related art, entry portions are prepared in a paper document, and the document whose entry portions are filled is submitted to a predetermined person in charge or the like. Then, the person who receives the submitted paper document needs to perform confirmation work on entry matters. An example of the confirmation work includes work for confirming presence or absence of a blank portion. At this time, in related art, the person in charge needs to visually confirm the presence or absence of the blank portion, which requires a lot of efforts for the confirmation work. On the other hand, when an electronic document is used as the document, efforts required for delivering the document is reduced, but the presence or absence of the blank portion must be confirmed visually in the same manner.

JP-A-2011-65311 discloses an image processing device. In the image processing device, a first image reception unit receives an image of a document not yet filled, and an entry area extraction unit extracts an entry area from the image received by the first image reception unit. Further, a first feature amount extraction unit extracts a feature amount of the image received by the first image reception unit. Then, a storage unit stores information on the entry area extracted by the entry area extraction unit and the feature amount extracted by the feature amount extraction unit.

JP-A-2012-198684 discloses an information processing device connected to a feature database that accumulates feature data related to appearance features of a form for each form type. The information processing device includes: an image data acquisition unit that acquires image data of a processing target form; a feature data acquisition unit that acquires feature data related to the processing target form from the image data; an estimation unit that estimates a form type of the processing target form by specifying feature data that matches or is similar to the feature data related to the processing target form from the feature data accumulated in the feature database; and a feature data addition unit that adds the feature data related to the processing target form to the feature database when the form type of the processing target form is not estimated by the estimation unit.

SUMMARY

A method of confirming presence or absence of a blank portion includes a method of registering entry portions of an electronic document in advance and specifying the blank portion based on the registered information, but work of registering the entry portions to be confirmed for each electronic document in advance is required. Further, when the electronic document is delivered by a flow of plural steps, the entry portions are different for each step even if the electronic document is the same, and the work of registering the entry portions for each step is complicated.

Aspects of non-limiting embodiments of the present disclosure relate to an information processing device capable of specifying a blank portion without registering an entry portion of an electronic document in advance.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing device including a processor configured to: group electronic documents that have been processed, based on similarity degree of the electronic documents into one or more groups; determine a group, among the one or more groups, to which at least one received electronic document is to belong; determine whether the at least one received document is a modified version of one or more electronic documents belonging to the determined group, the modified version having been partially modified with respect to the one or more electronic documents belonging to the determined group; and specify a blank portion in the at least one received electronic document by comparing the at least one received electronic document with the one or more electronic documents belonging to the determined group.

BRIEF DESCRIPTION OF DRAWINGS

Exemplary embodiment(s) of the present invention will be described in detail based on the following figures, wherein:

FIGS. 5A to 5C are diagrams comparing an image of a received electronic document with an image of an electronic document belonging to a determined group;

FIG. 7 is a diagram showing a schematic operation of the information processing system in a modification of the first exemplary embodiment;

FIG. 8 is a flowchart showing an operation of a management server according to the first exemplary embodiment;

FIG. 9 is a diagram showing an example of group information; and

DETAILED DESCRIPTION

Hereinafter, exemplary embodiments of the present invention will be described in detail with reference to the accompanying drawings.

<Description of Entire Information Processing System>

Figure 1:
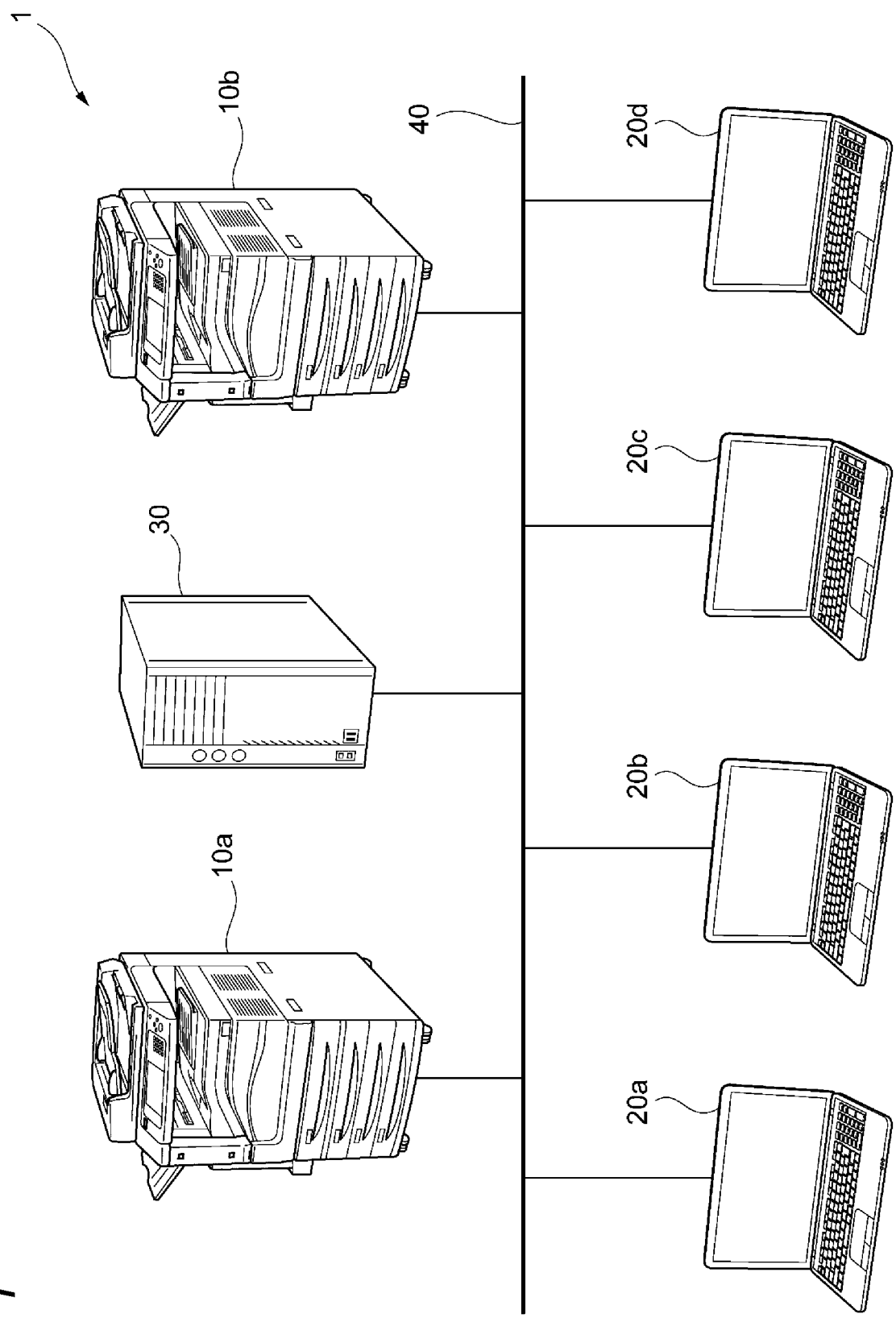
FIG. 1 is a view showing a configuration example of an information processing system according to an exemplary embodiment.

FIG. 1 is a view showing a configuration example of an information processing system 1 in the present exemplary embodiments.

The information processing system 1 of the present exemplary embodiments as shown is configured such that image formation devices 10a, 10b, terminal devices 20a, 20b, 20c, 20d and a management server 30 are connected via a network 40. When the image formation devices 10a, 10b are not distinguished from each other, the image formation devices 10a, 10b may be may be simply referred to as image formation devices 10 hereinafter. When the terminal devices 20a, 20b, 20c, 20d are not distinguished from each other, the terminal devices 20a, 20b, 20c, 20d may be simply referred to as terminal devices 20 hereinafter.

Although only two image formation devices 10 and four terminal devices 20 are shown in FIG. 1, the number of each may be any number.

The image formation device 10 is an example of an image processing device that performs image processing. The image formation device 10 has a printer function. That is, the image formation device 10 may form an image on a recording medium such as paper and output the image as a printing medium. In addition to the printer function, the image formation device 10 has other image processing functions such as a scanner function and a facsimile function.

Figure 2:
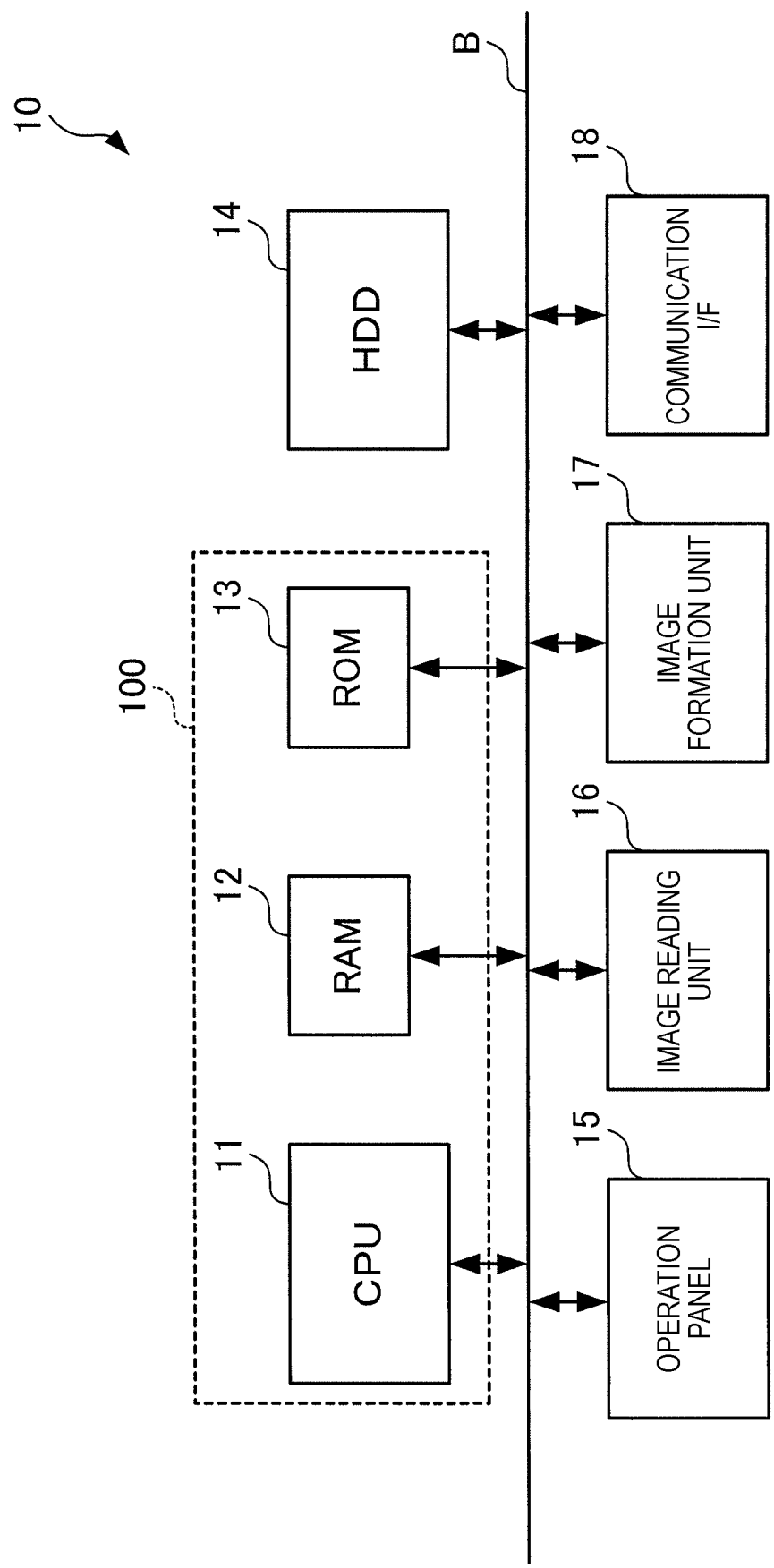
FIG. 2 is a diagram showing a hardware configuration example of an image formation device according to the exemplary embodiment.

FIG. 2 is a diagram showing a hardware configuration example of the image formation device 10.

As shown in the drawing, the image formation device 10 includes a central processing unit (CPU) 11, a random access memory (RAM) 12, a read only memory (ROM) 13, a hard disk drive (HDD) 14, an operation panel 15, an image reading unit 16, an image formation unit 17 and a communication I/F (Interface) 18. These components exchange necessary data via a bus B.

The CPU 11 loads various programs stored in the ROM 13 or the like into the RAM 12 and executes the programs to implement functions described below.

The RAM 12 is a memory used as a working memory or the like of the CPU 11.

The ROM 13 is a memory for storing the various programs to be executed by the CPU 11.

The HDD 14 is, for example, a magnetic disk device that stores image information read by the image reading unit 16 and image information used for image formation in the image formation unit 17.

The operation panel 15 is, for example, a touch panel that displays various types of information and receives operation input from a user. Therefore, a display mechanism includes a display unit such as a liquid crystal panel that displays content (information content) as an image in a predetermined area, and has a function of detecting a position where a contact object represented by a human finger or a stylus pen contacts the liquid crystal panel when the contact object comes into contact with the liquid crystal panel. The touch panel in the exemplary embodiments is not particularly limited, and various types of touch panels such as a resistance film type and a capacitance type may be used.

The image reading unit 16 reads an image recorded on a document. Here, the image reading unit 16 is, for example, a scanner, and preferably uses a CCD system in which reflected light of light emitted from a light source to a document is reduced by a lens and received by charge coupled devices (CCD), or a CIS system in which reflected light of light emitted from an LED light source to a document in order is received by a contact image sensor (CIS).

The image formation unit 17 is an example of a printing mechanism that forms the image on the recording medium. Here, the image formation unit 17 is, for example, a printer, and preferably uses an electrophotographic system that forms an image by transferring toner attached to a photoconductor to a recording medium such as paper, or an inkjet system that forms an image by ejecting ink onto a recording medium.

The communication I/F 18 transmits and receives the various types of information to and from other devices via a network.

In the exemplary embodiments, the CPU 11, the RAM 12 and the ROM 13 constitute a control unit 100 that controls each mechanical unit of the image formation device 10 serving as an own device.

The terminal device 20 creates and authorizes an electronic document as processing of the electronic document.

In the exemplary embodiments, the "electronic document" is an electronic version of character information and image information. As long as the electronic document may be handled by each of the image formation device 10, the terminal device 20 and the management server 30, a format, a data structure and the like thereof are not particularly limited. Here, the user may write by handwriting on the electronic document displayed on the terminal device 20 or on a printed material of the electronic document. The electronic document of the exemplary embodiments includes, for example, a form. Specific examples of the form include a quotation, an invoice, an order, an approval and an application.

The terminal device 20 is, for example, a general-purpose personal computer (PC). The terminal device 20 operates various types of application software under management of an operating system (OS) so as to create and browse the electronic document.

The management server 30 is an example of an information processing device, and is a server computer that manages the entire information processing system 1. The management server 30, for example, authenticates the user of the terminal device 20 and transmits the electronic document to the terminal device 20. The electronic document is received from the terminal device 20, and the received electronic document is stored. As will be described in detail below, the management server 30 performs processing of specifying a blank portion not yet filled by the user on the electronic document to be used when the image formation device 10 is used.

The terminal device 20 and the management server 30 include a CPU serving as a calculation unit, a main memory serving as a storage unit, and a storage such as an HDD or a solid state drive (SSD). Here, the CPU is an example of a processor, and executes various types of software such as basic software (OS) and application software. The main memory is a storage area for storing the various types of software, data used for execution of the software, and the like. The storage is a storage area for storing input data to the various types of software, output data from the various types of software, and the like.

The terminal device 20 and the management server 30 further include a communication interface (hereinafter, referred to as "communication I/F") for communicating with outside, a display mechanism including a video memory, a display and the like, and an input device such as a keyboard, a mouse, a touch panel and a stylus pen. The display mechanism functions as a display unit that displays the electronic document when the electronic document is browsed.

The network 40 is a communication unit used for information communication between the image formation device 10, the terminal device 20, and the management server 30, and is, for example, a local area network (LAN) or the Internet.

<Schematic Description of Operation of Information Processing System 1>

Figure 3:
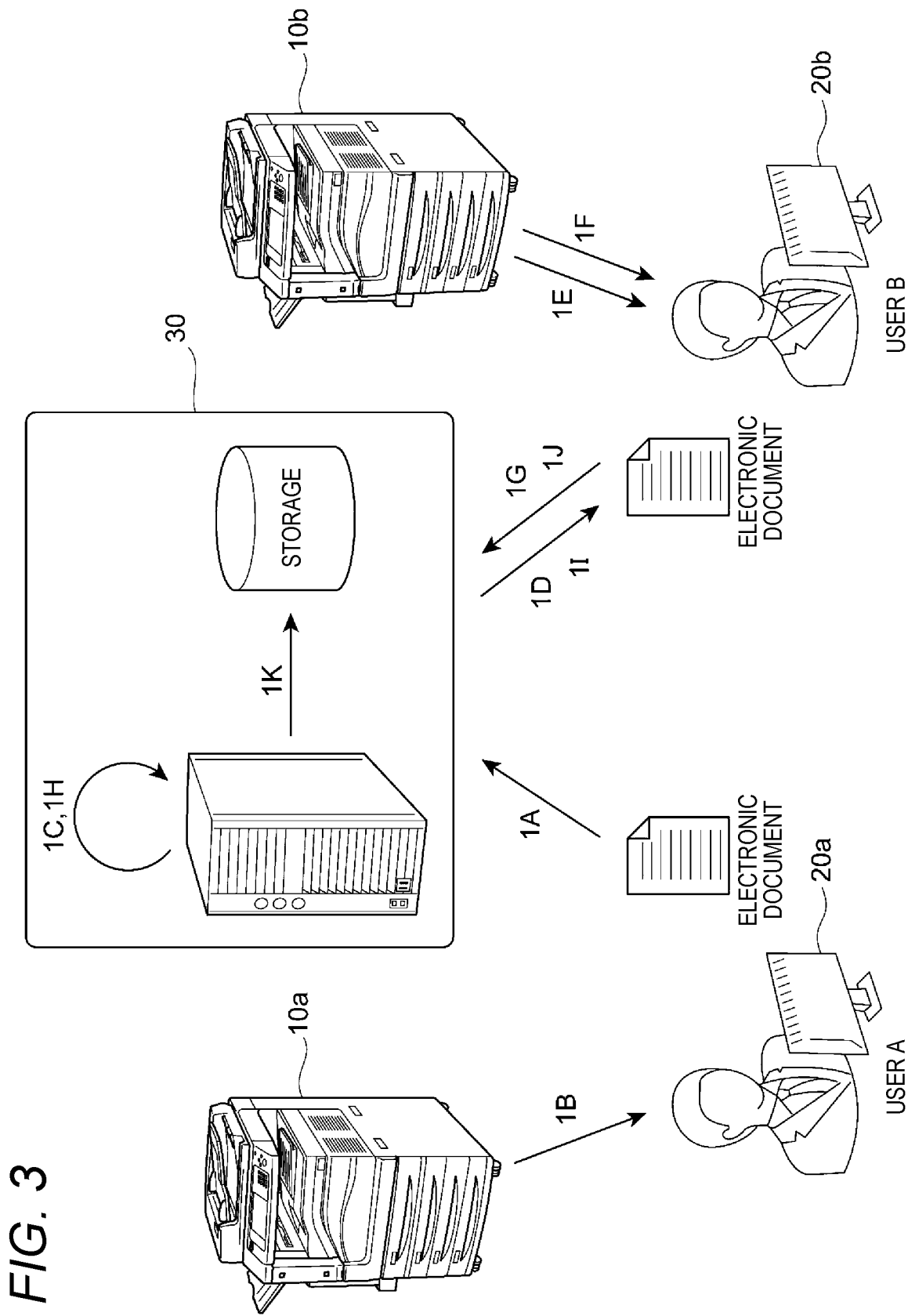
FIG. 3 is a view showing an example of a schematic operation of the information processing system.

FIG. 3 is a diagram showing an example of a schematic operation of the information processing system 1.

First, a user A who operates the terminal device 20a creates an electronic document. At this time, the user A creates the electronic document by using the application software such as document creation software or spreadsheet software. That is, the user A is a creator of the electronic document. Then, the user A uploads the created electronic document to the management server 30 (1A). At this time, the user A may scan the electronic document by the image formation device 10a and use the captured image as the electronic document (1B).

The electronic document uploaded by the user A is sent to the management server 30 via the network 40. Then, the management server 30 stores the electronic document, and groups electronic documents by a method described in detail below (1C).

The electronic document stored in the management server 30 is downloaded by a user B who operates the terminal device 20b as necessary (1D).

Then, the user B prints the downloaded electronic document by using the image formation device 10b as a printed material (1E). Then, the user B writes a necessary matter on the printed material by handwriting.

The user B scans the printed material in which the necessary matter is written by using the image formation device 10b, and captures an image of the written printed material (1F). Then, the user B uploads the captured image as an electronic document to the management server 30 (1G).

At this time, the user B may display the downloaded electronic document on the terminal device 20b without printing the downloaded electronic document, and write on the displayed screen using the input device. At this time, writing may be performed by handwriting by using the mouse or the stylus pen.

The electronic document uploaded by the user B is sent to the management server 30 via the network 40. Then, the management server 30 stores the electronic document, and compares the electronic document with the electronic document stored in the past by a method described in detail below. Then, it is detected whether there is a blank portion (1H). Here, the "blank portion" refers to a portion in the electronic document not yet filled by the user although the portion should originally be filled.

Then, when there is a blank portion, the terminal device 20b is notified or warned (1I). The user B fills the blank portion in the above procedure, and uploads the corrected electronic document to the management server 30 again (1J). Then, the corrected electronic document is stored in the storage of the management server 30 (1K).

In the above example, the user A creates the electronic document, but the electronic document does not necessarily need to be created by the user who uses the information processing system 1. For example, an electronic document published on the Internet may be used. This applies, for example, when an application handled by an administrative agency is downloaded from a website of the administrative agency and used. In this case, the above processing 1A and 1B is not necessary.

First Exemplary Embodiment

Next, the management server 30 will be described in detail. Here, first, a first exemplary embodiment of the management server 30 will be described. In the first exemplary embodiment, the management server 30 specifies a blank portion from an electronic document filled by a user.

<Description of Functional Configuration of Management Server 30>

Figure 4:
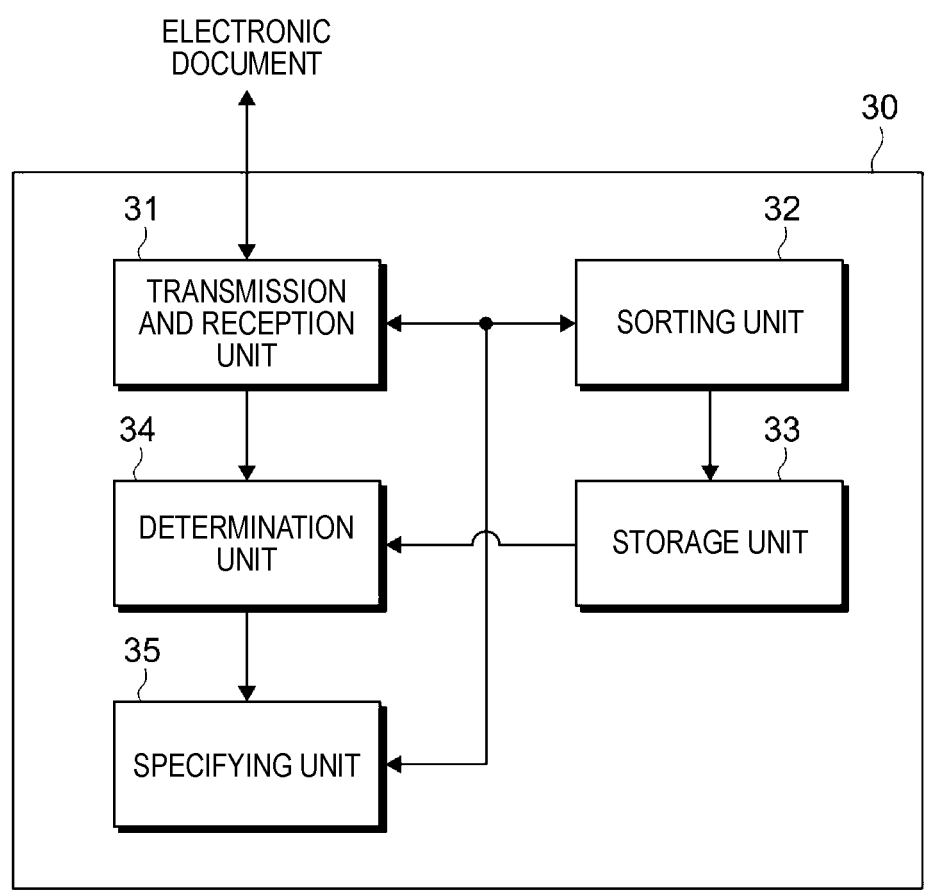
FIG. 4 is a block diagram showing a functional configuration example of a management server according to a first exemplary embodiment.

FIG. 4 is a block diagram showing a functional configuration example of the management server 30 according to the first exemplary embodiment.

Here, among various functions of the management server 30, those related to the present exemplary embodiment are selected and shown.

The management server 30 includes a transmission and reception unit 31 that transmits and receives information to and from an external device, a sorting unit 32 that groups electronic documents, a storage unit 33 that stores the electronic documents, a determination unit 34 that determines a group to which the electronic document belongs, and a specifying unit 35 that specifies the blank portion of the electronic document.

The transmission and reception unit 31 transmits and receives the electronic document to and from the terminal device 20. That is, the transmission and reception unit 31 is an example of a reception unit that receives the electronic document. The transmission and reception unit 31 corresponds to, for example, the communication I/F or the CPU.

The sorting unit 32 groups the electronic documents processed in the past based on similarity degree of the electronic documents, and stores the electronic documents in the storage unit 33. That is, the sorting unit 32 groups the electronic documents processed in the past into plural groups in advance. The electronic documents belonging to each of the plural groups are, for example, electronic documents based on the same form. That is, in the example shown in FIG. 3, the electronic document created by the user A and the electronic document in which the user B has written the necessary matter based on the electronic document created by the user A are grouped into the same group. On the other hand, different forms are grouped into other groups.

A range of the electronic documents to be grouped by the sorting unit 32 may be determined in advance. For example, all the electronic documents received by the management server 30 may be used. In addition, a range of the electronic documents handled by a predetermined department or a user may be used. Further, the electronic documents generated by scanning with a predetermined image formation device 10 may be used. In this case, the image formation device 10 may be a single device or plural devices. In addition to scan data generated by scanning by the image formation device 10, printing data printed by the image formation device 10 may also be the target electronic document.

The storage unit 33 stores the electronic documents grouped by the sorting unit 32. The storage unit 33 may store history of creation and submission of the electronic documents. The storage unit 33 corresponds to, for example, the main memory or the storage.

The storage unit 33 assigns a group ID for each group. Thereby, the electronic documents stored are managed for each group. The group ID is stored as group information together with the electronic documents. As will be described in detail below, other information may also be stored as the group information.

The determination unit 34 determines to which group sorted by the sorting unit 32 the electronic document received by the transmission and reception unit 31 is to belong. That is, when the electronic document is received by the transmission and reception unit 31, the determination unit 34 determines which group sorted in advance by the sorting unit 32 the electronic document belongs to.

The determination unit 34 may use an existing matching determination technology in order to determine the similarity degree of the electronic documents. The determination unit 34 determines, for example, the similarity degree based on structures of formats of the electronic documents.

Specifically, there is a method of determining the similarity degree based on positions of tables, drawings and texts. When the positions of the tables, the drawings and the texts substantially match, it is determined that the electronic documents belong to the same group. There is also a method of determining the similarity degree based on ruled lines of the tables. That is, the ruled lines described in the electronic documents are extracted. If the numbers of intersections of the ruled lines match, and coordinates of the intersections in the electronic documents almost match, it is determined that the electronic documents belong to the same group.

Further, when predetermined portions of the electronic documents are subjected to optical character reader (OCR) processing and character strings at the portions match, it may be determined that the electronic documents belong to the same group. The predetermined portion is, for example, an upper part or an upper right part of the electronic document, and a part where a predetermined item such as "quotation", "invoice", "order", "approval" or "application" is described is selected.

At this time, the determination unit 34 determines the similarity degree between the received electronic document and the electronic document processed in the past. When the similarity degree is high, it is determined that the received electronic document and the electronic document processed in the past belong to the same group. The electronic document processed in the past for determining the similarity degree may be one representative among plural electronic documents belonging to each group. In addition, comparison may be performed using a part of the plural electronic documents, or all the electronic documents.

The determination unit 34 uses, for example, a difference between images to determine the similarity degree. That is, an image of the difference between an image of the received electronic document and an image of the electronic document processed in the past is created. In the image of the difference, areas different from each other in these images are extracted. When an difference amount is within a predetermined range, the similarity degree is high, and it is determined that these electronic documents belong to the same group. When the difference amount is out of the predetermined range, it is determined that these electronic documents belong to different groups.

The difference amount may be, for example, the number of pixels at different portions and a ratio of the number of pixels at different portions to the total number of pixels. For example, if the ratio of the number of pixels as the difference amount is within ±5%, the determination unit 34 determines that these electronic documents belong to the same group. When the ratio is out of this range, that is, when the ratio of the number of pixels as the difference amount is smaller than −5% or larger than 5%, it is determined that these electronic documents belong to different groups.

When plural groups satisfies this condition, the determination unit 34 may select a group whose difference amount is closer to 0%. In addition, the determination unit 34 may select a group depending on whether a predetermined item in the electronic document matches. The item is, for example, a word indicating a type of the electronic document, and specifically, corresponds to words such as "quotation", "invoice", "order", "approval" and "application".

When the electronic document is the printing data, the determination unit 34 may determine to which group the electronic document is to belong by further using information of a file name assigned to the electronic document. For example, in a case where the electronic document is the printing data, the same or similar file name is often assigned when the original electronic document is the same. For example, the file names may be "○×Δ", "○×Δ1", "○×Δ modified", "○×Δ final version" and the like. In this case, a part of "○×Δ" is common. Therefore, based on this, the determination unit 34 may find a group in which the electronic document having a file name including "○×Δ" exists, and estimate that the received electronic document is to belong to this group. On the other hand, the image formation device 10 often automatically assigns a file name to the electronic document generated by user scanning. The automatically assigned file name is often greatly different from the file name of the original electronic document. For example, the file name may be a date+time. Therefore, when the electronic document is the printing data, it is possible to determine to which group the electronic document is to belong based on the information of the file name of the electronic document.

The specifying unit 35 specifies the blank portion in the received electronic document by comparing the received electronic document with the electronic document belonging to the group determined by the determination unit 34.

For this comparison, the specifying unit 35 specifies the blank portion based on the difference between the image of each electronic document belonging to the group determined by the determination unit 34 and the image of the received electronic document. That is, the difference between the image of the received the electronic document and the image of each electronic document belonging to the determined group is created. In this difference, areas different from each other in these images are extracted. Then, regarding the received electronic document, an area where the difference is negative is defined as the blank portion. Here, "the difference is negative" means that there is a description in the past electronic document, but no description in the received electronic document. That is, when the received electronic document has the blank portion, this portion may be specified by detecting the negative difference. In reality, when the difference amount is within the predetermined range, the specifying unit 35 specifies a portion where the difference exists as the blank portion. For example, the specifying unit 35 specifies a portion where a difference amount X is, for example, −5%≤X≤0% as the blank portion. On the contrary, when there is no description in the past electronic document while there is a description in the received electronic document, it may be said that "the difference is positive". This applies, for example, when the electronic document is modified and description matters are increased.

FIGS. 5A to 5C are diagrams comparing the image of the received electronic document with the image of the electronic document belonging to the determined group.

Among these, FIG. 5A is the image of the received electronic document, and FIG. 5B is the image of the electronic document belonging to the determined group. FIG. 5C shows the blank portion extracted based on the image in FIG. 5A and the image in FIG. 5B.

Here, as shown in FIG. 5A, the received electronic document has a blank portion M1 and entry portions K1 filled by the user. In FIG. 5B, a portion of the blank portion M1 is filled as an entry portion K2. In FIG. 5B, the entry portions K1 in FIG. 5A are similarly filled and are shown as entry portions K3. Then, by obtaining a difference between these images, the blank portion M1 in FIG. 5A is extracted as an area where the difference is negative as shown in FIG. 5C. The blank portion M1 may be presented to the user by, for example, being surrounded by a frame and displayed in red or highlighted.

When the electronic document is the printing data, the specifying unit 35 may specify it as a blank electronic document. On the other hand, when the electronic document is not the printing data, the specifying unit 35 may specify it as a filled electronic document. The printing data corresponds to, for example, the electronic document created by the application software such as the document creation software or the spreadsheet software. When the electronic document is not the printing data, for example, electronic document is scan data generated by scanning by the image formation device 10 or photograph data captured by a camera.

That is, in a case where the electronic document is the printing data, the electronic document is often the one before the user writes the necessary matter. In the example described above with reference to FIG. 3, it is the electronic document created by the user A, and the user B prints the electronic document with the image formation device 10*b*. On the other hand, the electronic document generated by scanning by the image formation device 10 is often an electronic document on which the user has written the necessary matter. In the example described above with reference to FIG. 3, it is the electronic document generated by scanning the printed material in which the necessary matter is written, by the user B, by using the image formation device 10*b*.

Figures 6A, 6B:
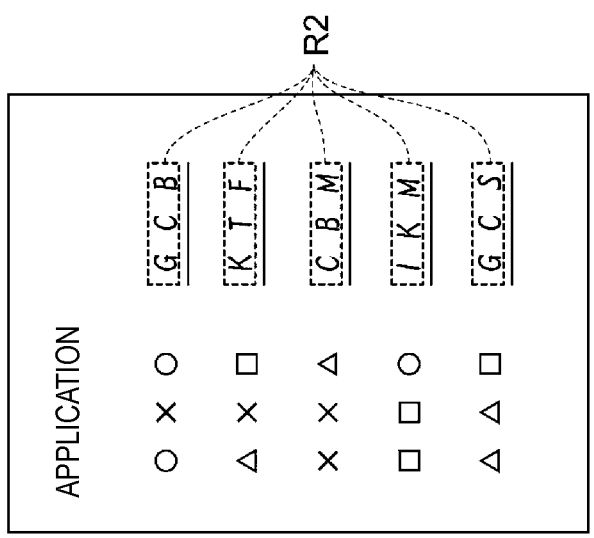
FIGS. 6A to 6C are diagrams comparing before and after writing is performed by a user.
Figure 6C:
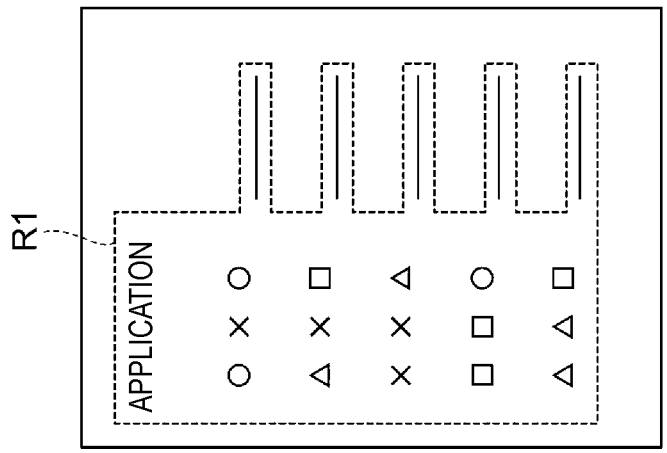

FIGS. 6A to 6C are diagrams comparing before and after writing is performed by the user.

Among them, FIG. 6A is an image of the printing data, and shows a state before the user performs the writing. FIG. 6B is an image of the scan data, and shows a state after the user performs the writing. FIG. 6C is an image of a difference between the image in FIG. 6A and the image in FIG. 6B.

Here, as shown in FIG. 6A, the image of the printing data occupies a range of an area R1. Then, as shown in FIG. 6B, the user writes in entry areas R2. Then, the image of the difference between these images is as shown in FIG. 6C, and the entry areas R2 of the user are extracted.

In this case, when the electronic document is received, the specifying unit 35 first obtains the difference between the received electronic document and the printing data. The specifying unit 35 specifies a portion the user has filled where the difference between the printing data and the received electronic document exists. Thereby, the entry areas R2 that are areas to be filled by the user may be specified. Then, by processing as described in FIG. 5, accuracy of specifying the blank portion is improved.

The sorting unit 32, the determination unit 34 and the specifying unit 35 correspond to, for example, the CPU.

<Modification>

Next, a modification of the first exemplary embodiment will be described.

FIG. 7 is a diagram showing a schematic operation of the information processing system 1 in the modification of the first exemplary embodiment.

First, the user A who operates the terminal device 20*a* creates an electronic document. Then, the user A submits the created electronic document (2A).

The electronic document is sent to the management server 30. Then, the management server 30 sends the electronic document to another user according to a predetermined order. In this case, the electronic document is sent to the user B (2B). The user B operates the terminal device 20*b* to inspect the electronic document created by the user A. That is, the user B is an inspector of the electronic document. If there is no problem in content of the electronic document, the user B performs authorization.

When the electronic document is authorized by the user B, the electronic document is sent to the management server 30. Further, the management server 30 sends the electronic document to the user C (2C). The user C operates the terminal device 20*c* to further authorize the electronic document inspected by the user B. That is, the user C is an authorizer of the electronic document. If there is no problem in the content of the electronic document, the user C performs authorization.

When the electronic document is authorized by the user C, the electronic document is sent to the management server 30. Further, the management server 30 sends the electronic document to the user D (2D). The user D operates the terminal device 20*d* to further perform final authorization of the electronic document authorized by the user C. That is, the user D is a final authorizer of the electronic document. If there is no problem in the content of the electronic document, the user D performs authorization.

When the electronic document is authorized by the user D, the electronic document is sent to the management server 30 and stored in a storage of the management server 30 (2E).

In this way, the electronic document is delivered by the users A to D here. Then, this flow includes four steps 2A to 2D in which the users A to D process the electronic document.

The electronic document created and authorize by the users may be scan data scanned by the image formation device 10, or may be printing data.

In the exemplary embodiment, the management server 30 specifies a blank portion for the electronic document sent from each of the user B, the user C, the user D. Thereby, the management server 30 performs a check at each step of the flow in which the same electronic document is delivered, so that the electronic document having the blank portion may be prevented from going to the next step.

In this case, the sorting unit 32 needs to group the electronic document for each step of the flow in which the same electronic document is delivered. However, in this case, an amount of writing added to each electronic document at each step may be small. For example, there may be only a difference in whether a seal has been stamped when the user B, the user C, the user D authorize.

In this case, in order for the determination unit 34 to determine a group, the determination unit 34 modifies a difference amount according to a type of the electronic document. That is, the determination unit 34 performs setting to reduce the difference amount for determining whether the electronic document to be delivered by such a flow belongs to the same group. Thereby, the group may be determined even if there is only the difference in whether the seal for authorization is stamped. The determination unit 34 may also determine the same electronic document when the predetermined item matches according to the similarity degree. For example, since it is based on the same electronic document, words such as "quotation", "invoice", "order", "approval" and "application" do not change. Therefore, the determination unit 34 may determine the group by viewing this item. However, in this case, an administrator who manages the management server 30 needs to set the item in advance.

The modification described above is particularly effective when there are a few types of electronic documents to be handled.

In addition, the determination unit 34 may modify the difference amount for the electronic document whose portion to be filled changes. The electronic document whose portion to be filled changes is an electronic document in which the portion to be filled is different depending on a state of a user. This is, for example, an electronic document that describes a parent field. In this case, both a father and a mother may be described, but only one of the father and the mother may be described in a case of a single parent. In this case, the portion to be filled or an amount to be filled changes. By setting the difference amount to a more appropriate amount for such an electronic document, the determination unit 34 may accurately determine to which group the received electronic document is to belong.

<Description of Operation of Management Server 30>

Next, an operation of the management server 30 in the first exemplary embodiment will be described.

FIG. 8 is a flowchart showing the operation of the management server 30 according to the first exemplary embodiment.

First, the transmission and reception unit 31 receives the electronic document from the terminal device 20 (step 101).

Next, the determination unit 34 determines which group the electronic document received by the transmission and reception unit 31 belongs to (step 102). As described above, this is determined by determining the similarity degree based on the difference between the image of the received electronic document and the image of the electronic document belonging to the group or the file name of the electronic document.

Further, the specifying unit 35 specifies the blank portion of the received electronic document (step 103). As described above, as the difference between the image of the received electronic document and the image of each electronic document belonging to the group determined by the determination unit 34, a portion where the negative difference is generated is defined as the blank portion.

Then, the specifying unit 35 determines whether the blank portion exists (step 104).

As a result, when there is no blank portion (No in step 104), the sorting unit 32 sorts the received electronic document into the group determined by the determination unit 34 and stores the electronic document in the storage unit 33 (step 105). At this time, the sorting unit 32 stores the group ID and the like described above as the group information.

FIG. 9 is a diagram showing an example of the group information.

The group information shown in the drawing is group information for one group, and actually, the group information exists as many pieces as the number of groups.

The group information includes the group ID, the number of intersections, an OCR result, the coordinates of the intersections, the number of pieces of stored data, stored data 1 to n, and entry area coordinates.

The number of intersections is the number of intersections of the ruled lines described above. The coordinates of intersections are coordinates of the intersections of ruled lines. The OCR result is a result of OCR at a predetermined portion in the electronic document described above, and is, for example, an item such as the quotation, the invoice or the like. The number of stored data is the number of electronic documents belonging to the group. Further, the stored data 1 to n are data of the electronic documents. Here, n electronic documents belong to the group. The stored data 1 to n may be included and stored in the group information, or may be stored separately from the group information. The entry area coordinates are coordinates of the entry areas R2 (see FIG. 6) in these electronic documents, and are coordinates of portions filled by the user.

With reference back to FIG. 8, in step 104, when the blank portion exits (Yes in step 104), a warning is issued to the terminal device 20 (step 106). The warning notifies the user of the blank portion. As the warning, for example, a method such as displaying the electronic document and displaying the blank portion by coloring in red or surrounding with a red frame may be considered.

Then, the transmission and reception unit 31 determines whether the modified electronic document has been received (step 107).

As a result, if not received (No in step 107), the processing returns to step 106.

On the other hand, if received (Yes in step 107), the processing returns to step 103.

By the management server 30 performing such an operation, the received electronic document is sorted by the sorting unit 32 to the group determined by the determination unit 34, and is stored by the storage unit 33. Therefore, when one electronic document is received, the number of electronic documents belonging to any group is increased by one. Thereby, the processed electronic documents are grouped and accumulated. When the received electronic document is a new electronic document different from the past electronic documents, the sorting unit 32 performs sorting by creating a new group.

Second Exemplary Embodiment

Next, a second exemplary embodiment of the management server 30 will be described. In the second exemplary embodiment, the management server 30 not only specifies a blank portion of a user in a received electronic document h but also detects whether the electronic document is a modified version.

<Description of Functional Configuration of Management Server 30>

A functional configuration example of the management server 30 of the second exemplary embodiment is the same as in FIG. 4. That is, the management server 30 includes the transmission and reception unit 31, the sorting unit 32, the storage unit 33, the determination unit 34 and the specifying unit 35. Functions of the transmission and reception unit 31, the sorting unit 32, the storage unit 33 and the specifying unit 35 are the same as those in the first exemplary embodiment. On the other hand, the determination unit 34 in the second exemplary embodiment has functions in addition to functions of the determination unit 34 in the first exemplary embodiment. Therefore, the determination unit 34 will be mainly described below.

As in the first exemplary embodiment, the determination unit 34 determines to which group sorted by the sorting unit 32 the received electronic document is to belong.

In the second exemplary embodiment, in addition to this, the determination unit 34 determines that the received electronic document is a modified version in which the electronic document belonging to the determined group is partially modified. Here, the "modified version" is an electronic document whose part is modified with respect to the original electronic document. This may also be said that the "modified version" is the electronic document that has undergone a minor change with respect to the original electronic document.

That is, a small modification in the electronic document may be generated routinely. For example, a date, an orderer, a person in charge, an address of an own company or the like may be modified for an invoice, a quotation or the like. For example, this applies when a system is modified in a new year or when a new nursery school item is added regarding an application for entering a nursery school. For example, this applies when a format is modified due to law revision in a financial institution. For example, a signature field for security enhancement may be newly added to prevent international money laundering. In addition, terms of a contract may be modified.

In this way, in a case where the electronic document is modified, when the determination unit 34 determines the group, similarity degree of other groups may be higher than similarity degree of the group of the original electronic document. Then, the determination unit 34 may determine that the modified version belongs to another group different from the group of the original electronic document before the change. Therefore, if it is possible to determine whether the received electronic document is the modified version, accuracy of grouping is further improved.

Therefore, in the second exemplary embodiment, the determination unit 34 determines whether the received electronic document is the modified version.

Specifically, as in the first exemplary embodiment, the determination unit 34 obtains a difference between an image of each electronic document belonging to the determined group and an image of the received electronic document. Then, it is determined whether the received electronic document is the modified version based on the difference.

A more specific example of this matter will be described below.

When a tendency of the difference is different from the related art, the determination unit 34 estimates that the received electronic document is the modified version. That is, when a difference generated in the received electronic document has a predetermined change compared with a difference generated in the electronic document belonging to the group and processed in the past, the determination unit 34 estimates that the received electronic document is the modified version.

The "when a difference has a predetermined change" is, for example, the following case.
(Change in Difference Amount)

A difference amount in a related-art electronic document is, for example, −2%, and in the received electronic document, when becoming −4%, the difference amount changes. This is generated, for example, when the modified version in which the number of fields to be described is increased is received. An example in which the number of fields is increased corresponds to a case where the number of authorizers is increased.
(Positive and Negative Change in Difference Amount)

The difference amount in the related-art electronic document is, for example, −2%, and in the received electronic document, when becoming 2%, the difference amount changes from negative to positive. This is generated, for example, when the modified version in which options of the user are increased is received. An example in which the options of the user are increased corresponds to a case where the number of nursery schools that may be selected is increased in the modified version compared with the original electronic document regarding the application for entering the nursery school.
(Change in Portion where Difference is Generated)

This is a case where a portion where a difference in the received electronic document is generated changes as compared with a portion where a difference is generated in the related-art electronic document. This applies, for example, when a portion where a seal is stamped is moved.

A type of the electronic document may be clearly specified by an item such as the invoice or the quotation, and there is no difference in this, but the change is generated in other portions in the modified version.

When a large positive difference is generated only in a part of an area, it means that a matter not added to the related-art electronic document is added in the received electronic document. For example, except for that the terms of the contract are the same, terms to be confirmed are newly added in the modified version.
(Color Change)

In contrast to the related-art electronic document, the received electronic document has a difference in consideration of color, but when binarized into black and white, the difference may not be generated. This means that the color changes in the modified version. For example, a color of the seal may change from red to blue in the modified version.

Next, the determination unit 34 performs a predetermined determination on the electronic document estimated as the modified version, and determines whether the received electronic document is the modified version.

In the "predetermined determination", the determination unit 34 finds a feature point of the difference, and determines that the received electronic document is the modified version when the feature point satisfies a predetermined condition. This is, for example, the following cases:
(Inquiry to User)

When there is an answer that the received electronic document is the modified version as a result of an inquiry to the user, the modified version is determined. At this time, the determination unit 34 may display, for example, the related-art electronic document and the received electronic document side by side, and present the user with the portion where the difference is generated. Thereby, even when the person in charge changes, the user may determine whether the received electronic document is the modified version. In this case, the feature point of the difference is the answer of the user to the portion where the difference is generated, and the determination unit 34 determines that the received electronic document is the modified version when the answer of the user is the modified version.
(Difference Amount)

When the difference amount in the related-art electronic document is, for example, −2%, and when the difference amount in the received electronic document is within ±1% from the difference amount of the related-art electronic document of −2% (that is, −1% or smaller and −3% or larger), the determination unit 34 determines that the received electronic document is the modified version. In this case, the feature point of the difference is the difference amount, and the determination unit 34 determines that the received electronic document is the modified version when the difference amount is within a predetermined range. Here, the difference amount serving as a reference is the difference amount in the related-art electronic document, but the reference may be 0% without difference.

(Reception Time)

When a predetermined number or more of electronic documents having the same difference amount are received within a predetermined period, the determination unit 34 determines that these are the modified version. In this case, feature points of the difference are time when the same difference is generated, the difference amount and the number of received electronic documents. In this case, the feature point is exemplified by a case where plural received electronic documents are in the same group and has approximately the same difference. Then, when the predetermined number or more of electronic documents having the difference amount within a predetermined range are received within the predetermined period, the determination unit 34 determines that these are the modified version.

(Reception from Plural People)

When the electronic documents having the same difference amount are received from plural people, the determination unit 34 determines that these are the modified version. In this case, the feature point of the difference is the number of users and the difference amount. In this case, the feature point is exemplified by the case where the plural received electronic documents are in the same group and has approximately the same difference. Then, when the electronic documents having the difference amount within the predetermined range are received from the plural people, the determination unit 34 determines that these are the modified version.

(Confirmation of Modification)

When a modification is confirmed by the Internet, a database or the like for the portion where the difference is generated, the determination unit 34 determines that the received electronic document is the modified version. For example, an address modification due to relocation of a head office or a branch office may be confirmed by an inquiry to the Internet, the database or the like. In this case, the feature point of the difference is that the modification is confirmed for the portion where the difference is generated, and the determination unit 34 determines that the received document is the modified version when the modification is confirmed for the portion where the difference is generated.

(Modified Object)

When the portion where the difference is generated is a modification of a predetermined type such as a modification of a form of the electronic document or an addition of a number, the determination unit 34 determines that the received document is the modified version. In this case, the feature point of the difference is that the portion where the difference is generated is a predetermined type. For example, the determination unit 34 distinguishes between a printed part and a handwritten part of the electronic document, and when the portion where the difference is generated is the printed part, the determination unit 34 determines that the received document is the modified version. That is, the determination unit 34 finds the feature point by distinguishing between an entry portion that is a portion described by the user and other portions. In this case, in anticipation of registration of the modified version, the user may create in advance an instruction or mode indicating that the form or number may change or be added.

(Modification Other than Predetermined Item)

When the portion where the difference is generated is other than items such as a quotation, an invoice, an order, an approval and an application, the determination unit 34 determines that the received document is the modified version. In this case, the feature point of the difference is that the portion where the difference is generated is other than a predetermined item. The feature point is exemplified by a case where plural received electronic documents are in the same group and have a predetermined portion that does not change. The determination unit 34 determines the predetermined item, and when the portion where the difference is generated other than this, the determination unit 34 determines that the received document is the modified version.

When there are plural groups corresponding to the received electronic documents, the determination unit 34 selects the group determined to be the modified version. When it is determined that both are the modified version, or when it is determined that both are not the modified version, the determination unit 34 may select a group whose difference amount is closer to 0%.

The determination unit 34 may divide the electronic document into predetermined sections and compare each section to determine whether the received document is the modified version. That is, if a method of obtaining the entire difference is employed for obtaining the above difference, the entire difference may appear as a large difference. For example, in a case where the number of lines in the written document changes, even though it is a little different when viewed partially, it may appear as the large difference due to an image shift. That is, even a minor change may result in the large difference.

In order to prevent this, the determination unit 34 divides the section by a predetermined symbol in the electronic document. The symbol is, for example, "I", "II", "III", (1), (2), (3) representing a unit, a space described at a beginning of a paragraph, a ruled line of a table, or the like. That is, the determination unit 34 divides the section by using the symbol as a mark. Then, the determination unit 34 extracts a difference for each section. Then, if the number of sections is the same but a difference appears only in some sections, the electronic document may be determined to be the modified version.

<Description of Operation of Management Server 30>

Next, an operation of the management server 30 in the second exemplary embodiment will be described.

Figure 10:
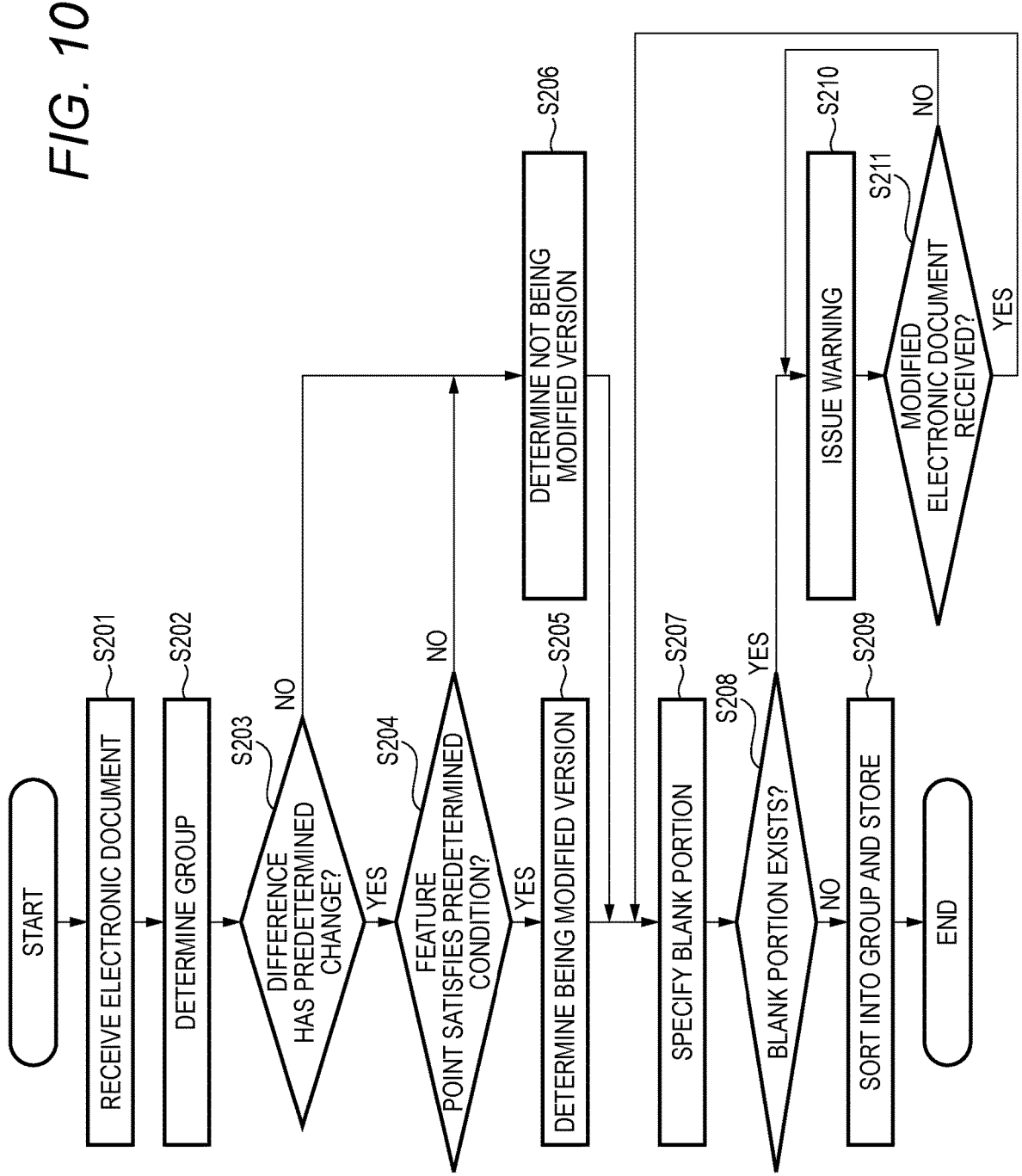
FIG. 10 is a flowchart showing an operation of the management server according to the second exemplary embodiment.

FIG. 10 is a flowchart showing the operation of the management server 30 according to the second exemplary embodiment.

Since steps 201 to 202 are the same as steps 101 to 102 in FIG. 8, description thereof will be omitted.

After step 203, the determination unit 34 determines whether the difference generated in the received electronic document has the predetermined change (step 203). The predetermined change corresponds to a case where the difference amount and the portion where the difference is generated in the electronic document described above change.

As a result, when the difference has the predetermined change (Yes in step 203), the determination unit 34 finds the feature point of the difference, and determines whether the feature point satisfies the predetermined condition (step 204). The feature point of the difference corresponds to the difference amount or the reception time described above.

When the feature point satisfies the predetermined condition (Yes in step 204), the determination unit 34 determines that the received electronic document is the modified version (step 205).

On the other hand, when the difference does not have the predetermined change (No in step 203) and when the feature point does not satisfy the predetermined condition (No in step 204), the determination unit 34 determines that the received electronic document is not the modified version (step 206).

The following steps 207 to 211 are the same as steps 103 to 107 in FIG. 8. However, in step 209, the sorting unit 32 groups the received electronic document, stores the received electronic document in the storage unit 33, and stores information indicating that the received electronic document is the modified version as group information.

According to the first exemplary embodiment, the information processing device or the like capable of specifying the blank portion without registering the entry portion of the electronic document in advance may be provided. Thereby, a burden on the administrator who manages the information processing system 1 may be reduced. The user may replenish the blank portion. The accuracy of grouping may further be improved by replenishing the blank portion and eliminating the blank portion.

According to the second exemplary embodiment, in addition to this, whether the received electronic document is the modified version may be determined, and the accuracy of grouping is further improved.

In the example described above, the management server 30 specifies the blank portion and determines the modified version, but the present invention is not limited thereto. For example, the terminal device 20 may make performance. The image formation device 10 may also make performance.

Although not mentioned in the example described above, the management server 30 may not only specify the blank portion and allow the user to make a correction, but may thereafter perform other processing such as processing specified by the user. Another example of the processing is processing such as transferring a scanned electronic document to another device. In addition, when the user is asked to confirm the blank portion and the user determines that it is not the blank portion, the portion may be prevented from being treated as the blank portion.

The sorting unit 32 extracts the entry areas R2 (see FIG. 6) in the group, and when there are electronic documents different from others, the sorting unit 32 may delete these electronic documents from the group and sort the electronic documents into a new group. Thereby, the accuracy of grouping is further improved.

When a large number of electronic documents are accumulated in the group and the entry areas R2 in the electronic document are clearer, the specifying unit 35 may specify the blank portion by using the entry area coordinates shown in FIG. 9. That is, since the coordinates of the portion described by the user are known based on the entry area coordinates, it is determined that the portion is the blank portion when there is no entry there.

Then, accuracy of the entry areas R2 may be improved by asking the user to confirm the entry areas R2.

<Description of Program>

Here, the processing performed by the management server 30 of the present exemplary embodiment described above is prepared as a program such as software. The program is implemented by cooperation of software and hardware resources.

Therefore, in the first exemplary embodiment, a program that executes processing performed by the management server 30 may also be regarded as a program that causes a computer to implement: a sorting function of grouping electronic documents processed in the past based on similarity degree of the electronic documents; a reception function of receiving an electronic document; a determination function of determining which group sorted by the sorting function the electronic document received by the reception function corresponds to; and a specifying function of specifying a blank portion in the received electronic document by comparing the received electronic document with the electronic document belonging to the group determined by the determination function.

In addition, in the second exemplary embodiment, a program that executes processing performed by the management server 30 may also be regarded as a program that causes a computer to implement: a sorting function of grouping electronic documents processed in the past based on similarity degree of the electronic documents; determination function of determining which group sorted by the sorting function a received electronic document corresponds to and determining that the received electronic document is a modified version in which the electronic document belonging to the group is partially modified; and a specifying function of specifying a blank portion in the received electronic document by comparing the received electronic document with the electronic document belonging to the determined group.

The program for implementing the exemplary embodiments may be provided not only by communication means but also by being stored in a recording medium such as a CD-ROM.

In the embodiments above, the term "processor" refers to hardware in a broad sense. Examples of the processor includes general processors (e.g., CPU: Central Processing Unit), dedicated processors (e.g., GPU: Graphics Processing Unit, ASIC: Application Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

[1] According to another aspect of the invention, there is provided an information processing device including a processor configured to group electronic documents that have been processed, based on similarity degree of the electronic documents into one or more group, receive an electronic document, determine a group, among the one or more groups, to which the received electronic document is to belong, and specify a blank portion in the received electronic document by comparing the received electronic document with one or more electronic documents belonging to the determined group.

[2] In the information processing device according to [1], the processor may specify the blank portion based on a difference between at least one image of the one or more electronic documents belonging to the determined group and an image of the received electronic document.

[3] In the information processing device according to [2], in a case where a difference amount of the difference is within a predetermined range, the processor may determine a portion where the difference exists as the blank portion.

[4] In the information processing device according to [3], the processor may correct the predetermined range according to a type of the one or more electronic document and the received electronic document.

[5] In the information processing device according to [4], the processor may correct the predetermined range for an electronic document with a variable entry portion.

[6] In the information processing device according to [1], in a case where the received electronic document is printing data, the processor may specify the received electronic document as a blank electronic document.

[7] In the information processing device according to [6], in a case where the received electronic document is not the printing data, the processor may specify the received electronic document as a filled electronic document, and specify a portion where a difference between an image based on the printing data and an image of the received electronic document exists as a portion filled by a user.

[8] In the information processing device according to [6], in a case where the received electronic document is the printing data, the processor may determine the group to which the received electronic document is to belong based on information of a file name assigned to the received electronic document.

[9] In the information processing device according to [1], the processor may group the electronic documents for each step in a flow in which a same electronic document is delivered.

[10] In the information processing device according to [9], the processor may determine the same electronic document in a case where a predetermined item matches.

[11] According to another aspect of the invention, there is provided an information processing system including:
an image processing device that performs image processing; and
an information processing device that performs processing to specify a blank portion which has not been written in by a user on an electronic document used with the image processing device, wherein
the information processing device includes a processor configured to
group electronic documents that have been processed, based on similarity degree of the electronic documents into one or more group,
receive an electronic document,
determine a group, among the one or more groups, to which the received electronic document is to belong, and
specify a blank portion in the received electronic document by comparing the received electronic document with one or more electronic documents belonging to the determined group.

[12] According to another aspect of the invention, there is provided a non-transitory computer readable medium storing a program causing a computer to execute a process including:
grouping electronic documents that have been processed, based on similarity degree of the electronic documents into one or more group,
receiving an electronic document,
determining a group, among the one or more groups, to which the received electronic document is to belong, and
specifying a blank portion in the received electronic document by comparing the received electronic document with one or more electronic documents belonging to the determined group.

What is claimed is:

1. An information processing device comprising:
a processor configured to
group electronic documents that have been processed, based on a similarity degree of the electronic documents into one or more groups;
determine a group, among the one or more groups, to which at least one received electronic document is to belong;
determine whether the at least one received document is a modified version of one or more electronic documents belonging to the determined group based on a difference between at least one image of the one or more electronic documents belonging to the determined group and an image of the at least one received electronic document, the modified version having been partially modified with respect to the one or more electronic documents belonging to the determined group; and
specify a blank portion in the at least one received electronic document by comparing the at least one received electronic document with the one or more electronic documents belonging to the determined group.

2. The information processing device according to claim 1, wherein
the processor is configured to estimate that the at least one received electronic document is the modified version in a case where a predetermined change from the difference among the one or more electronic documents belonging to the determined group to the difference between the at least one image of the one or more electronic documents belonging to the determined group and the image of the at least one received electronic document is found.

3. The information processing device according to claim 2, wherein
the processor is configured to estimate that the at least one received electronic document is the modified version in a case where the predetermined change is found in at least one of a difference amount, and a portion where the difference occurs in the electronic documents.

4. The information processing device according to claim 2, wherein
the processor is configured to
find a difference feature point, and
determine that the at least one received electronic document is the modified version in a case where the difference feature point satisfies a predetermined condition.

5. The information processing device according to claim 4, wherein
the at least one received document includes a plurality of received documents,
the processor finds the difference feature point in a case where the plurality of received electronic documents is determined as belonging to a same group and a difference among the plurality of received documents is within a predetermined range.

6. The information processing device according to claim 4, wherein
the at least one received document includes a plurality of received documents,
the processor finds the difference feature point in a case where the plurality of received electronic documents is determined as belonging to a same group and there is a predetermined unmodified portion in each of the plurality of received electronic documents.

7. The information processing device according to claim 4, wherein
the processor finds the difference feature point by distinguishing between an entry portion written in by a user and other portions.

8. The information processing device according to claim 1, wherein
the processor is configured to
find a difference feature point, and
determine that the at least one received electronic document is the modified version in a case where the difference feature point satisfies a predetermined condition.

9. The information processing device according to claim 8, wherein
the at least one received document includes a plurality of received documents,
the processor finds the difference feature point in a case where the plurality of received electronic documents is determined as belonging to a same group and a difference among the plurality of received documents is within a predetermined range.

10. The information processing device according to claim 8, wherein
the at least one received document includes a plurality of received documents,
the processor finds the difference feature point in a case where the plurality of received electronic documents is determined as belonging to a same group and there is a predetermined unmodified portion in each of the plurality of received electronic documents.

11. The information processing device according to claim 8, wherein
the processor finds the difference feature point by distinguishing between an entry portion written in by a user and other portions.

12. The information processing device according to claim 1, wherein
the processor is configured to
divide the electronic document into sections, and
compare each section to determine whether the at least one received electronic document is the modified version.

13. The information processing device according to claim 12, wherein
the processor divides the electronic document into the sections according to a predetermined symbol in the electronic document.

14. An information processing system comprising:
an image processing device that performs image processing; and
an information processing device that performs processing to specify a blank portion which has not been written in by a user on an electronic document used with the image processing device, wherein
the information processing device includes a processor configured to
group electronic documents that have been processed, based on a similarity degree of the electronic documents into one or more groups,
determine a group, among the one or more groups, to which at least one received electronic document is to belong,
determine whether the at least one received document is a modified version of the one or more electronic documents belonging to the determined group based on a difference between at least one image of the one or more electronic documents belonging to the determined group and an image of the at least one received electronic document, the modified version having been partially modified with respect to the one or more electronic documents belonging to the determined group, and
specify a blank portion in the at least one received electronic document by comparing the at least one received electronic document with the one or more electronic documents belonging to the determined group.

15. A non-transitory computer readable medium storing a program causing a computer to execute a process comprising:
grouping electronic documents that have been processed, based on a similarity degree of the electronic documents into one or more groups;
determining a group, among the one or more groups, to which at least one received electronic document is to belong;
determining whether the at least one received document is a modified version of the one or more electronic documents belonging to the determined group based on a difference between at least one image of the one or more electronic documents belonging to the determined group and an image of the at least one received electronic document, the modified version having been partially modified with respect to the one or more electronic documents belonging to the determined group; and
specifying a blank portion in the at least one received electronic document by comparing the at least one received electronic document with the one or more electronic documents belonging to the determined group.

* * * * *